US012488329B2

(12) United States Patent
Ratcliffe, Jr. et al.

(10) Patent No.: US 12,488,329 B2
(45) Date of Patent: Dec. 2, 2025

(54) VIRTUAL REALITY ENVIRONMENT FOR TEACHING CHILDREN ABOUT MONEY

(71) Applicant: Truist Bank, Charlotte, NC (US)

(72) Inventors: Ronald Lee Ratcliffe, Jr., Garner, NC (US); Reinaldo Gamaliel Rivera Colon, Raleigh, NC (US); Jennifer Merten, Brookhaven, GA (US)

(73) Assignee: Truist Bank, Charlotte, NC (US)

( * ) Notice: Subject to any disclaimer, the term of this patent is extended or adjusted under 35 U.S.C. 154(b) by 231 days.

(21) Appl. No.: 17/843,655

(22) Filed: Jun. 17, 2022

(65) Prior Publication Data

US 2023/0410079 A1 Dec. 21, 2023

(51) Int. Cl.
*G06Q 30/00* (2023.01)
*G06Q 20/22* (2012.01)
*G06Q 20/40* (2012.01)
*G06T 11/00* (2006.01)
*G09B 19/18* (2006.01)

(52) U.S. Cl.
CPC ....... *G06Q 20/2295* (2020.05); *G06Q 20/405* (2013.01); *G06T 11/00* (2013.01); *G09B 19/18* (2013.01)

(58) Field of Classification Search
CPC .................................................. G06Q 20/2295
USPC ............ 705/44, 1.1, 35, 38, 36 R, 39, 14.23
See application file for complete search history.

(56) References Cited

U.S. PATENT DOCUMENTS

| | | | | |
|---|---|---|---|---|
| 11,023,977 | B1* | 6/2021 | Khurana | G06F 3/0481 |
| 2020/0051460 | A1* | 2/2020 | Bedor | G09B 19/22 |
| 2020/0322754 | A1* | 10/2020 | Soule | G06V 40/16 |
| 2022/0180344 | A1* | 6/2022 | Fenichel | G06Q 20/3221 |

OTHER PUBLICATIONS

ProQuestDialogNPL Search History.*
ip.com NPL Search History.*

* cited by examiner

*Primary Examiner* — John H. Holly
(74) *Attorney, Agent, or Firm* — Kilpatrick Townsend & Stockton LLP; Michael A. Springs, Esq.

(57) ABSTRACT

A virtual reality environment for teaching children about money is provided. For example, a computing system can generate a virtual reality environment associated with a child user account linked to a parent user account. The virtual reality environment can include an interactive gaming element. The computing system can output the virtual reality environment to a user device associated with the child user account. The computing system can receive, from the user device, an input for the interactive gaming element. The computing system can determine, based on the input, an update to a financial balance in the child user account. The computing system can output, to the user device, the update to the financial balance for display in the virtual reality environment.

18 Claims, 3 Drawing Sheets

VIRTUAL REALITY ENVIRONMENT FOR TEACHING CHILDREN ABOUT MONEY

TECHNICAL FIELD

The present disclosure relates to virtual reality environments. More specifically, but not by way of limitation, this disclosure relates to generating virtual reality environments for teaching children about money.

BACKGROUND

Virtual reality environments can represent objects and other items in three-dimensional space. Virtual reality environments can be displayed to users via headsets and other display devices. Sounds corresponding to the virtual reality environment can be transmitted to the user through virtual reality headsets, headphones, and other auditory devices. Virtual reality controllers can provide haptic feedback corresponding to the virtual reality environment to the user. Through virtual reality headsets, virtual reality controllers, and other devices, users can interact with objects and other items represented in virtual reality environments.

SUMMARY

In some examples, a system can include a processor and a non-transitory computer-readable memory. The non-transitory computer-readable memory can include instructions that are executable by the processor for causing the processor to perform operations. The operations can include generating a virtual reality environment associated with a child user account linked to a parent user account, the virtual reality environment comprising an interactive gaming element. The operations can include outputting the virtual reality environment to a user device associated with the child user account. The operations can include receiving, from the user device, an input for the interactive gaming element. The operations can include determining, based on the input, an update to a financial balance in the child user account. The operations can include outputting, to the user device, the update to the financial balance for display in the virtual reality environment.

In other examples, a computer-implemented method can include generating, by a processor, a virtual reality environment associated with a child user account linked to a parent user account, the virtual reality environment comprising an interactive gaming element. The method can include outputting, by the processor, the virtual reality environment to a user device associated with the child user account. The method can include receiving, by the processor, from the user device, an input for the interactive gaming element. The method can include determining, by the processor, an update to a financial balance in the child user account based on the input. The method can include outputting, by the processor, the update to the financial balance for display in the virtual reality environment to the user device.

In another example, a non-transitory computer-readable medium can comprise program code that is executable by the processor for causing the processor to perform operations. The operations can include generating a virtual reality environment associated with a child user account linked to a parent user account, the virtual reality environment comprising an interactive gaming element. The operations can include outputting the virtual reality environment to a user device associated with the child user account. The operations can include receiving, from the user device, an input for the interactive gaming element. The operations can include determining, based on the input, an update to a financial balance in the child user account. The operations can include outputting, to the user device, the update to the financial balance for display in the virtual reality environment.

DETAILED DESCRIPTION

Figure 1:
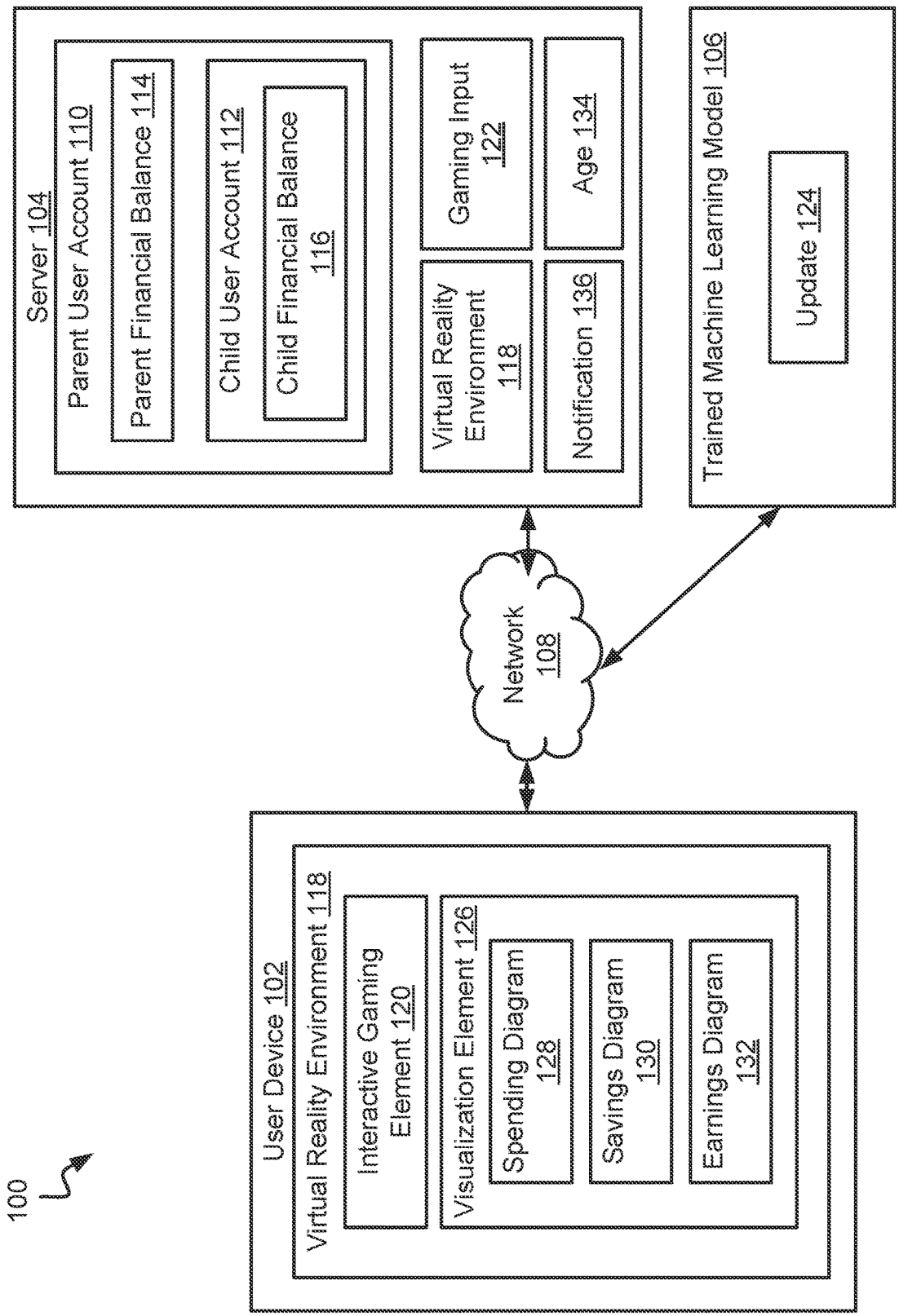
FIG. 1 is a block diagram illustrating an example of a computing environment including a virtual reality environment for teaching children about money according to some aspects of the present disclosure.

Certain aspects and features relate to generating a virtual reality environment for teaching children about money. Users, such as children, can interact with an interactive gaming element within the virtual reality environment. The interactive gaming element can be connected to a child user account, and funds from a parent user account can be deposited to the child user account based on the interaction with the interactive gaming element. For example, the interactive gaming element may include games directed to teaching financial literacy principles in a child-friendly and visually appealing manner. Completing a game may result in a certain amount of funds being transferred to the child user account from the parent user account. The interactive gaming elements may provide a mechanism for a parent to controllably provide more financial freedom to a child based on performance in the virtual reality environment.

Additionally, the virtual reality environment can include other elements for teaching children financial literacy. For example, the virtual reality environment can include virtualization elements such as graphics that can be displayed based on changes to the financial balance in the child user account. Such virtualization elements can include diagrams displaying proportions or amounts of money that have been spent, saved, or earned from the user account. The diagrams can be pie charts, graphs, cartoons, or any other type of diagram or visual element. In some examples, the visualization elements may be personalized to the user. For example, if the user is a younger child, the virtual reality environment may display virtualization elements that are more visually simple, have bright colors, or include cartoon elements. The virtualization elements can help the user visualize how the funds in the child user account are being used, and can help the user make more informed financial decisions.

In some examples, notifications may be transmitted to a user device associated with the parent user account based on changes to the child financial account. For example, if the value of funds withdrawn from the child user account over a certain period of time exceeds a predetermined threshold, a notification of excess spending may be sent to the user device. Additionally, the notification may be displayed in the virtual reality environment. In some examples, the notification may be transmitted in response to detecting a particular merchant code associated with a transaction made using funds from the child user account. In some examples, the child user account may have restrictions on fund transfers or withdrawals based on rules received from the parent user account.

These illustrative examples are given to introduce the reader to the general subject matter discussed here and are not intended to limit the scope of the disclosed concepts. The following sections describe various additional features and examples with reference to the drawings in which like numerals indicate like elements.

FIG. 1 is a block diagram illustrating an example of a computing environment 100 including a virtual reality environment 118 for teaching children about money according to some aspects of the present disclosure. The computing environment 100 can include a user device 102, a server 104, and a trained machine learning model 106 communicatively coupled via a network 108. Each communication within the computing environment 100 may occur over one or more data networks, such as a public data network, a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN").

Examples of user devices can include desktop computers, videogame consoles, mobile phones (e.g., cellular phones), PDAs, tablet computers, net books, laptop computers, handheld specialized readers, and wearing devices such as smart watches. The server 104 can generate a virtual reality environment 118 for the child user account 112 and can transmit the virtual reality environment 118 to the user device 102 for display. In some examples, the virtual reality environment 118 can be a non-immersive virtual reality environment in which a user may interact with the virtual reality environment 118, such as a video game, through the user device 102. In some examples, the virtual reality environment 118 can be a fully immersive or semi-immersive virtual reality environment, and the user device 102 can include or be communicatively coupled with a virtual reality headset. An immersive virtual reality environment may provide a realistic simulation experience in which a user is immersed within the virtual reality environment 118. For example, the virtual reality headset may render a virtual reality environment 118 for display to a user. In some examples, the user device 102 can include a controller in communication with the virtual reality environment 118 for receiving input from a user of user device 102, or for providing sensory output to the user of the user device 102. In further examples, the virtual reality environment 118 may be an augmented reality environment that may overlay elements of the virtual reality environment 118 over the real world as viewed through the user device 102, such as a mobile phone.

The virtual reality environment 118 can include elements for teaching children about money. For example, the virtual reality environment 118 can include content for teaching children the fundamentals of spending, saving, giving, and investing. The teaching elements can include cartoons, videos, or other media explaining financial literacy concepts. The teaching elements can further include an interactive gaming element 120 that a user can interact with using the user device 102. In some examples, the virtual reality environment 118 can mimic reality. For example, the interactive gaming element 120 may be a game simulating a job. The user may play as a chef, a mailman, a detective, or any other job to earn virtual credits. In some examples, the interactive gaming element 120 may include educational games related to financial literacy. For example, the educational games may include a testing element for testing a user's knowledge of financial literacy in exchange for virtual credits. The user can interact with the interactive gaming element 120 on the user device to send gaming inputs 122 to the server 104, such as with the virtual reality headset or controller.

The server 104 can include user accounts associated with the virtual reality environment 118. For example, the server 104 can include a parent user account 110, which can be a financial user account that includes a parent financial balance 114. The parent user account 110 can be attached to or can include a child user account 112. The child user account can be a financial user account with restrictions placed via the parent user account 110. For example, the child user account 112 may have restrictions on amounts or frequencies of withdrawal from the child financial balance 116. The child user account 112 may be connected to the virtual reality environment 118. For example, funds from the parent user account 110 may be automatically deposited into the child user account 112 in response to certain conditions in the virtual reality environment 118 being met. In one example, virtual credits earned in the interactive gaming element 120 can be converted into funds deposited into the child user account 112. In another example, the server 104 can deposit funds into the child user account 112 from the parent user account 110 in response to a user completing a certain number of interactive gaming elements 120 directed towards teaching about financial literacy in the virtual reality environment 118. The child financial balance 116 can be available to the user for use in the virtual reality environment 118 or in the real world.

In some examples, the virtual reality environment 118 can include visualization elements 126 that can provide information to the user about their particular child user account 112 as a tool for teaching financial literacy. For example, the visualization elements 126 can include spending diagrams 128, savings diagrams 130, earnings diagrams 132, or any other diagrams for displaying the child financial balance 116 in the child user account 112. In some examples, the visualization element 126 or the interactive gaming element 120 can include personalized content based on the spending, saving, and earning characteristics of the child user account 112. For example, if the child user account 112 is primarily used for spending with low earnings and little to no saving, the virtual reality environment 118 can include content directed towards encouraging the user to increase savings or earnings.

In some examples, the server 104 can transmit notifications 136 to a user device, such as the user device 102, associated with the parent user account 110 in response to certain behaviors in the virtual reality environment 118 or the child user account 112. For example, the server 104 can transmit a notification 136 in response to certain changes in the child financial balance 116, such as a certain amount of spending within a particular time period. In another example, the server 104 can analyze merchant codes associated with transactions to determine if spending from the child user account 112 is exceeding a predetermined threshold for any particular game or product. The server 104 can transmit a notification 136 in response to spending exceeding the predetermined threshold. In some examples, the notifications 136 can also be transmitted to the user device 102 to be displayed in the virtual reality environment 118.

The teaching elements displayed in the virtual reality environment 118 can be tailored according to characteristics of the user associated with the child user account 112. For example, the server 104 can determine or can receive an age 134 for the user. The server 104 can input the age 134 and the visualization element 126 into a trained machine learning model 106. The trained machine learning model 106 can output updates 124 to the virtual reality environment 118 that correspond to the age 134 of the user. For example, the updates 124 can include simplifying sentence structures or word choices based on the age 134. The visualization elements 126 can be updated to include simpler diagrams, such as pie charts to demonstrate proportions of spending, saving, and earning. Alternatively, if the user is older, the update 124 may include more detailed graphics.

The numbers of devices depicted in FIG. 1 are provided for illustrative purposes. Different numbers of devices may be used. For example, while certain devices or systems are shown as single devices in FIG. 1, multiple devices may instead be used to implement these devices or systems. Similarly, devices or systems that are shown as separate, such as the trained machine learning model 106 and the server 104, may instead be implemented in a single device or system.

Figure 2:
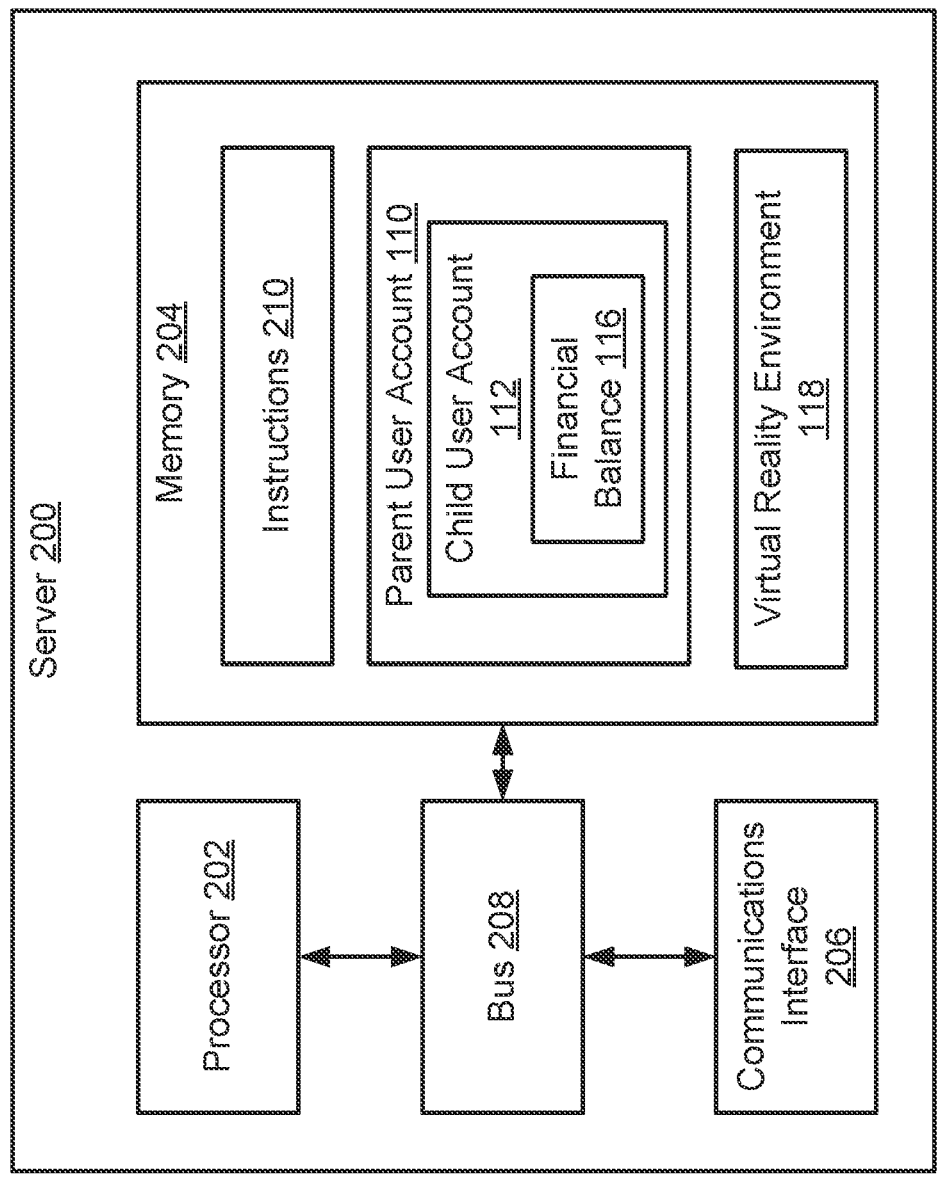
FIG. 2 is a block diagram of an example of a server including a virtual reality environment for teaching children about money according to some aspects of the present disclosure.

FIG. 2 is a block diagram of a server 200 including a virtual reality environment 118 for teaching children about money according to some aspects of the present disclosure. For example, the server 200 may be used as the server 104 from FIG. 1. The server 200 can include a processor 202, a memory 204, and a communications interface 206 that are communicatively connected via a bus 208. In some examples, the components shown in FIG. 2 can be integrated into a single structure. For example, the components can be within a single housing. In other examples, the components shown in FIG. 2 can be distributed (e.g., in separate housings) and in electrical communication with each other.

The processor 202 can execute one or more operations for implementing some examples. The processor 202 can execute instructions 210 stored in the memory 204 to perform the operations. The processor 202 can include one processing device or multiple processing devices. Non-limiting examples of the processor 202 include a Field-Programmable Gate Array ("FPGA"), an application-specific integrated circuit ("ASIC"), a microprocessor, etc.

The processor 202 can be communicatively coupled to the memory 204. The non-volatile memory 204 may include any type of memory device that retains stored information when powered off. Non-limiting examples of the memory 204 include electrically erasable and programmable read-only memory ("EEPROM"), flash memory, or any other type of non-volatile memory. In some examples, at least some of the memory 204 can include a medium from which the processor 202 can read instructions. A computer-readable medium can include electronic, optical, magnetic, or other storage devices capable of providing the processor 202 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C #, etc.

The memory 204 can include a parent user account 110 that can include a child user account 112. The parent user account 110 and child user account 112 can be financial accounts associated with financial institutions. For example, the child user account 112 may have a financial balance 116 representing an amount of funds within the child user account 112. The memory 204 can also include a virtual reality environment 118 generated by the processor 202. The server 200 can output the virtual reality environment to another device, such as the user device 102 depicted in FIG. 1, via the communications interface 206. The server 200 can also receive inputs related to the virtual reality environment 118 via the communications interface 206. The server 200 can then generate updates to the virtual reality environment 118 based on the inputs.

Figure 3:
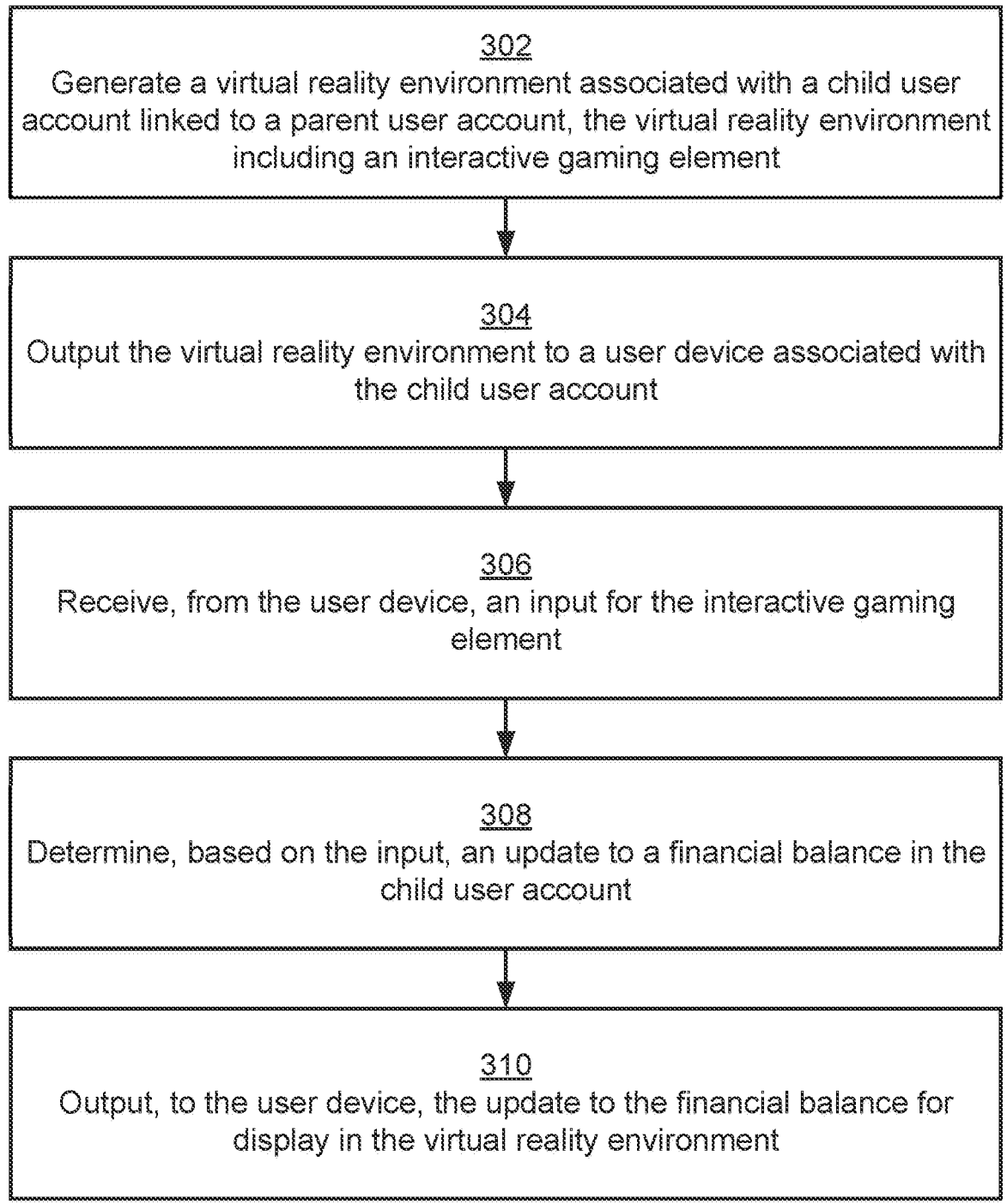
FIG. 3 is a flowchart illustrating an example of a process for generating a virtual reality environment for teaching children about money according to some aspects of the present disclosure.

FIG. 3 is a flowchart illustrating an example of a process for generating a virtual reality environment for teaching children about money according to some aspects of the present disclosure. The process of FIG. 3 can be implemented by the computing environment 100 of FIG. 1 or the server 200 of FIG. 2, but other implementations are also possible.

At block 302, the processor 202 can generate a virtual reality environment 118 associated with a child user account 112 linked to a parent user account 110. The virtual reality environment 118 can include an interactive gaming element 120. The interactive gaming element 120 can be directed towards teaching a user, such as a child, financial literacy principles. For example, the interactive gaming element 120 can be used to teach a user how to operate a bank account, how to calculate payments for loans, how to invest, how to save money, or any other financial tips or practices. At block 304, the processor 202 can output the virtual reality environment 118 to a user device 102 associated with the child user account 112. The virtual reality environment 118 and the interactive gaming element 120 can be tailored to characteristics of the child user account 112. For example, the interactive gaming element 120 may be more or less difficult, or may include more or less complicated financial principles, based upon an age 134 of the user associated with the child user account 112. As time passes, the complexity of the interactive gaming element 120 may increase as the child grows older.

At block 306, the processor 202 can receive, from the user device 102, an input 122 for the interactive gaming element 120. For example, the user device 102 can transmit commands for playing the interactive gaming element 120. At block 308, the processor 202 can determine, based on the input 122, an update to a financial balance 116 in the child user account 112. For example, the processor 202 can determine a transfer of funds from the parent user account 110 to the child user account 112. Alternatively, the processor 202 can determine a transfer of funds from the child user account 112 to the parent user account 110. In additional examples, the processor 202 can determine restrictions or removal of restrictions for functions of the child user account 112.

At block 310, the processor 202 can output, to the user device, the update to the financial balance 116 for display in the virtual reality environment 118. For example, the update may be displayed as a visualization element 126. The processor 202 can generate the visualization element 126 based on the update. For example, if the update involved transferring funds to the child user account 112, the update could include an earnings diagram 132 demonstrating the change in funds. The processor 202 can output the visualization element 126 for display in the virtual reality environment 118. Other examples of visualization elements 126 can include spending diagrams 128 and savings diagrams 130.

In some examples, the processor 202 can receive another update to the financial balance 116 in the child user account 112. For example, funds in the child user account 112 may be withdrawn in a transaction, such as a microtransaction in a video game. The processor 202 can determine that the withdrawn funds exceed a predetermined threshold, and can transmit a notification 136 to a user device associated with the parent user account 110 to indicate the update to the financial balance 116 in the child user account 112. Additionally, the notification 136 can be transmitted to the user device 102 for display in the virtual reality environment 118.

The foregoing description of certain examples, including illustrated examples, has been presented only for the purpose of illustration and description and is not intended to be exhaustive or to limit the disclosure to the precise forms disclosed. Numerous modifications, adaptations, combinations, and uses thereof are possible without departing from the scope of the disclosure.

What is claimed is:

1. A system comprising:
a processor; and
a non-transitory computer-readable memory comprising instructions that are executable by the processor for causing the processor to:
generate a virtual reality environment associated with a child user account linked to a parent user account, the virtual reality environment comprising an interactive gaming element comprising an educational game in which virtual credits are earnable;
execute a trained machine learning model to generate an update to a sentence structure of the educational game based on an input of an age of a user associated with the child user account;
execute the trained machine learning model to generate another update to a visualization element of the educational game based on another input of the age of the user and the visualization element;
modify the educational game in the virtual reality environment based on the update to the sentence structure and the other update to the visualization element generated by the trained machine learning model;
output the virtual reality environment to a user device associated with the child user account;
receive, from the user device, an input for the interactive gaming element answering financial literacy questions in the educational game;
determine, based on the input, an update to a financial balance of virtual credits in the child user account;
output, to the user device, the update to the financial balance for display in the virtual reality environment; and
convert the virtual credits into funds by automatically depositing the funds from the parent user account into the child user account.

2. The system of claim 1, wherein the memory further comprises instructions that are executable by the processor for causing the processor to determine the update to the financial balance in the child user account by:
in response to receiving the input for the interactive gaming element, determining a transfer of funds between the parent user account and the child user account.

3. The system of claim 1, wherein the memory further comprises instructions that are executable by the processor for causing the processor to:
receive another update to the financial balance in the child user account;
determining that the other update to the financial balance exceeds a predetermined threshold; and
in response to determining that the other update exceeds the predetermined threshold, transmitting, to the parent user account, a notification indicating the other update to the financial balance in the child user account.

4. The system of claim 1, wherein the memory further comprises instructions that are executable by the processor for causing the processor to output the update to the financial balance for display in the virtual reality environment by:
generating the visualization element based on the update to the financial balance; and
outputting the visualization element for display in the virtual reality environment.

5. The system of claim 4, wherein the visualization element comprises a spending diagram, a savings diagram, and an earnings diagram.

6. The system of claim 4, wherein the memory further comprises instructions executable by the processor for causing the processor to:
determine the age of the user associated with the child user account; and
update the visualization element based on the age of the user.

7. A method comprising:
generating, by a processor, a virtual reality environment associated with a child user account linked to a parent user account, the virtual reality environment comprising an interactive gaming element comprising an educational game in which virtual credits are earnable;
executing, by the processor, a trained machine learning model to generate an update to a sentence structure of the educational game based on an input of an age of a user associated with the child user account;
executing, by the processor, the trained machine learning model to generate another update to a visualization element of the educational game based on another input of the age of the user and the visualization element;
modifying, by the processor, the educational game in the virtual reality environment based on the update to the sentence structure and the other update to the visualization element generated by the trained machine learning model;
outputting, by the processor, the virtual reality environment to a user device associated with the child user account;
receiving, by the processor, from the user device, an input for the interactive gaming element answering financial literacy questions in the educational game;
determining, by the processor, an update to a financial balance of virtual credits in the child user account based on the input;
outputting, by the processor, the update to the financial balance for display in the virtual reality environment to the user device; and
converting, by the processor, the virtual credits into funds by automatically depositing the funds from the parent user account into the child user account.

8. The method of claim 7, wherein determining the update to the financial balance in the child user account further comprises:

in response to receiving the input for the interactive gaming element, determining a transfer of funds between the parent user account and the child user account.

9. The method of claim 7, further comprising:
receive another update to the financial balance in the child user account;
determining that the other update to the financial balance exceeds a predetermined threshold; and
in response to determining that the other update exceeds the predetermined threshold, transmitting, to the parent user account, a notification indicating the other update to the financial balance in the child user account.

10. The method of claim 7, wherein outputting the update to the financial balance for display in the virtual reality environment further comprises:
generating the visualization element based on the update to the financial balance; and
outputting the visualization element for display in the virtual reality environment.

11. The method of claim 10, wherein the visualization element comprises a spending diagram, a savings diagram, and an earnings diagram.

12. The method of claim 10, further comprising:
determining the age of the user associated with the child user account; and
updating the visualization element based on the age of the user.

13. A non-transitory computer-readable medium comprising program code that is executable by a processor for causing the processor to:
generate a virtual reality environment associated with a child user account linked to a parent user account, the virtual reality environment comprising an interactive gaming element comprising an educational game in which virtual credits are earnable;
execute a trained machine learning model to generate an update to a sentence structure of the educational game based on an input of an age of a user associated with the child user account;
execute the trained machine learning model to generate another update to a visualization element of the educational game based on another input of the age of the user and the visualization element;
modify the educational game in the virtual reality environment based on the update to the sentence structure and the other update to the visualization element generated by the trained machine learning model;
output the virtual reality environment to a user device associated with the child user account;
receive, from the user device, an input for the interactive gaming element answering financial literacy questions in the educational game;
determine, based on the input, an update to a financial balance of virtual credits in the child user account;
output, to the user device, the update to the financial balance for display in the virtual reality environment; and
convert the virtual credits into funds by automatically depositing the funds from the parent user account into the child user account.

14. The non-transitory computer-readable medium of claim 13, wherein the program code is further executable by the processor for causing the processor to determine the update to the financial balance in the child user account by:
in response to receiving the input for the interactive gaming element, determining a transfer of funds between the parent user account and the child user account.

15. The non-transitory computer-readable medium of claim 13, wherein the program code is further executable by the processor for causing the processor to:
receive another update to the financial balance in the child user account;
determining that the other update to the financial balance exceeds a predetermined threshold; and
in response to determining that the other update exceeds the predetermined threshold, transmitting, to the parent user account, a notification indicating the other update to the financial balance in the child user account.

16. The non-transitory computer-readable medium of claim 13, wherein the program code is further executable by the processor for causing the processor to output the update to the financial balance for display in the virtual reality environment by:
generating the visualization element based on the update to the financial balance; and
outputting the visualization element for display in the virtual reality environment.

17. The non-transitory computer-readable medium of claim 16, wherein the visualization element comprises a spending diagram, a savings diagram, and an earnings diagram.

18. The non-transitory computer-readable medium of claim 16, wherein the program code is further executable by the processor for causing the processor to:
determine the age of the user associated with the child user account; and
update the visualization element based on the age of the user.

* * * * *